United States Patent
Collins

[15] 3,656,347
[45] Apr. 18, 1972

[54] DEVICE AND METHOD FOR SAMPLING MOLTEN METAL

[72] Inventor: William J. Collins, 7005 Madison Street, Merrillville, Ind. 46401

[22] Filed: June 24, 1970

[21] Appl. No.: 49,576

Related U.S. Application Data

[63] Continuation-in-part of Ser. No. 713,640, Mar. 18, 1968, which is a continuation-in-part of Ser. Nos. 391,654, Aug. 24, 1964, abandoned, and Ser. No. 590,829, Oct. 31, 1966, Pat. No. 3,415,124, and Ser. No. 649,764, May 12, 1967, Pat. No. 3,415,125, Continuation of Ser. No. 810,287, Mar. 25, 1969, abandoned.

[52] U.S. Cl. ........................... 73/354, 73/425.4, 73/DIG. 9
[51] Int. Cl. ........................................................... G01n 1/12
[58] Field of Search ................ 249/164; 73/421 MM, 425.4, 73/425.6, 354

[56] References Cited

UNITED STATES PATENTS

| | | | |
|---|---|---|---|
| 3,415,124 | 12/1968 | Collins | 73/425.4 |
| 3,455,164 | 7/1969 | Boyle | 73/421 |
| 3,457,790 | 7/1969 | Hacket | 73/425.4 |
| 3,415,125 | 12/1968 | Collins | 73/425.4 |
| 3,221,559 | 12/1965 | Miller, Sr. et al. | 73/421 MM |
| 3,406,736 | 10/1968 | Jett et al. | 73/421 MM |
| 3,452,602 | 7/1969 | Hacket | 73/421 MM |
| 3,463,005 | 8/1969 | Hance | 73/421 MM |
| 3,481,201 | 12/1969 | Falk | 73/421 MM |
| 440,801 | 11/1890 | Adams | 249/164 |

FOREIGN PATENTS OR APPLICATIONS 249,417   9/1966   Austria ........................ 73/421 MM Primary Examiner—S. Clement Swisher
Attorney—Charles S. Penfold

[57] ABSTRACT

The invention involves utilizing a device which is adapted to be dipped into a bath of molten metal for obtaining a sample and the temperature thereof for analysis.

28 Claims, 7 Drawing Figures

PATENTED APR 18 1972

INVENTOR.
WILLIAM J. COLLINS
BY Charles S. Penfold
ATTORNEY

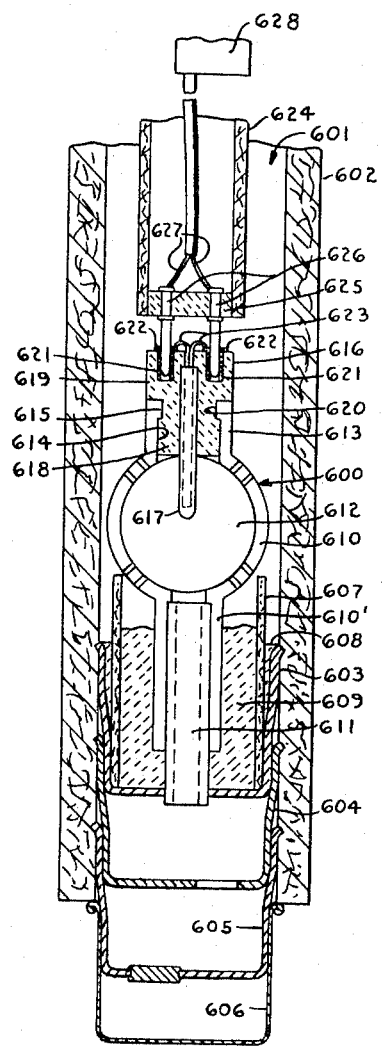
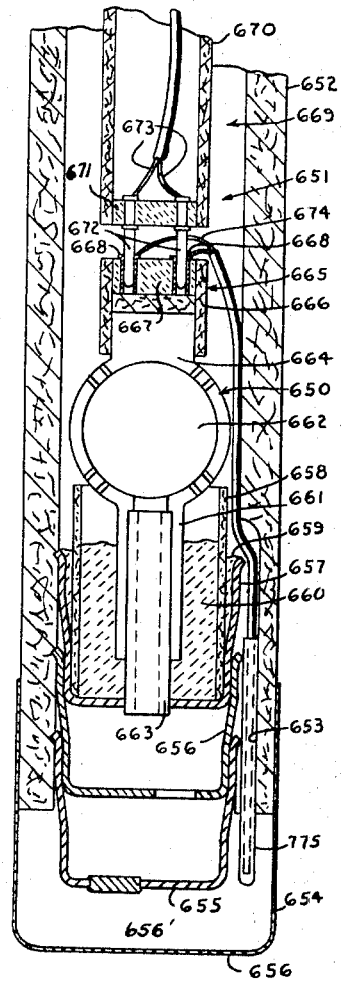
Fig-5
Fig-6
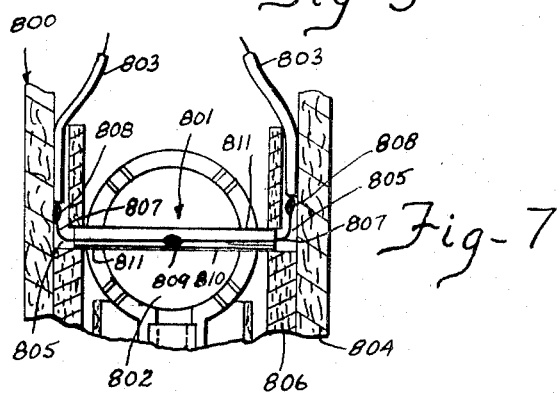
Fig-7
INVENTOR.
WILLIAM J. COLLINS
BY Charles S. Penfold
ATTORNEY

DEVICE AND METHOD FOR SAMPLING MOLTEN METAL

This application is a continuation-in-part of my application Serial No. 713,640 filed Mar. 18, 1968, now abandoned and the latter application is a continuation-in-part of my applications Ser. Nos. 391,654; filed Aug. 24, 1964, now abandoned, 590,829, now U.S. Pat. No. 3,415,124, filed May 12, 1967 and 649,764. This application is also a continuation, filed Oct. 31, 1966 of my application Ser. No. 810,287 now U.S. Pat. No. 3,415,125, now abandoned filed Mar. 25, 1969.

The device may be employed wherever applicable and has proven very efficient and reliable in obtaining samples of molten metal for chemical analysis of all of its elements including the amount of gases, such as oxygen, hydrogen and nitrogen contained therein may be ascertained. The sample may be obtained from any chamber such as an open hearth furnace, a basic oxygen vessel, electric furnace or related metal making facility. The sample obtained may also be tested to determine its physical characteristics.

An important object of the invention is to provide a device which, among other things, comprises an outer protective housing; means disposed in the housing for receiving a hot liquid, such as molten metal; supporting means, such as a mass of insulating material or cement, which supports the receiving means; means providing an entrance structure or chamber means communicating with the receiving means, and means disposed in relation to the entrance structure for deoxidizing the molten metal prior to its entry into the receiving means.

A significant object of the invention is to provide a device of the character above described with means preferably in the form of a thermocouple which is operatively associated with the device and/or receiving means whereby to assist in obtaining additional technical or scientific data concerning the sample.

Additional objects reside in providing a device which offers advantages with respect to manufacture and assembly, efficiency, durability, safety, and destruction whereby to obtain access to the recovered specimen.

Other objects and advantages of the invention will become apparent after the description hereinafter set forth is considered in conjunction with the drawings annexed hereto.

Referring to the drawings:

FIG. 5 is a vertical section taken through a device which includes one form of a thermocouple assembled therewith;

FIG. 6 is a vertical section taken through a modified device showing a thermocouple associated therewith in a mode different from that disclosed in FIG. 5; and FIG. 7 is a partial vertical section of a modified device.

Figure 1:
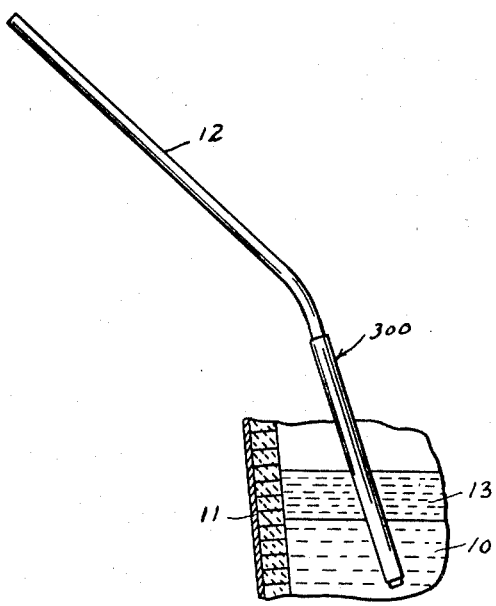
FIG. 1 is a view showing at least one mode of manipulating the device for use in obtaining a specimen from a vessel of molten metal, with only a portion of the vessel being shown.
Figure 2:
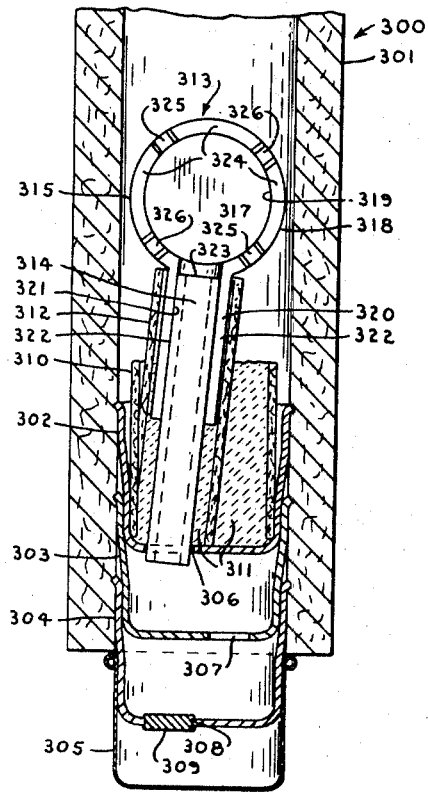
FIG. 2 is a vertical sectional view of a sampling device.
Figure 4:
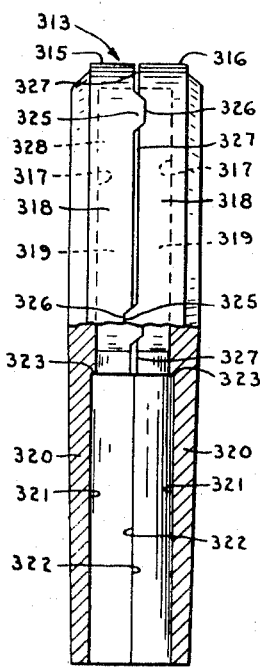
FIG. 4 is an elevational view showing half sections of certain of the structure shown in FIGS. 2 and 3.
Figure 3:
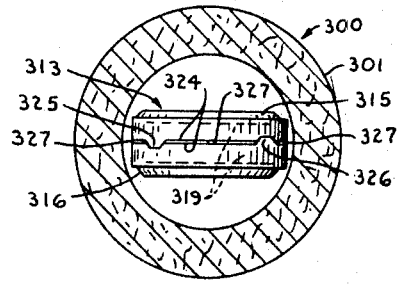
FIG. 3 is a transverse section taken through FIG. 2.

The structure exemplified in the FIGS. 2, 3 and 4 of the drawings does not constitute the subject invention and is shown merely as a prelude or foundation to support the invention or inventions illustrated in FIGS. 5, 6 and 7.

The device generally designed at 300, for example, includes an outer jacket or tubular housing 301, constructed of some desirable frangible material such as heavy cardboard, and a unit comprising plurality of cups 302, 303, 304 and 305 which are operatively connected to define a chamber 303', 304', and 305'. The three cups 302, 303 and 304 having rims which bite into the housing when the unit is press-fitted into place and the cup or cap 305 has a rim which preferably engages the lower end of the housing. The bottom wall of the uppermost cup 302 is provided with an opening 306, the bottom wall of cup with an opening 307 and the bottom wall of cup 304 with an opening 308 in which is secured a deoxidizing fusible element 309, such as aluminum.

It will be observed that aperture 307 is offset with respect to a line extending through the axes of the apertures 306 and 308.

The device 300 also preferably includes a relatively short tube 310 which is preferably firmly secured in the innermost cup 302 by a mass of high temperature cement or insulating material 311. An inner tube 312 having a diameter less and a length greater than the tube 310 has a lower extremity firmly secured by the cement in the tube 310 and cup 302 and against the bottom wall of the latter in general alignment with the aperture 306. In practice these tubes 310 and 312 are constructed from cardboard, but it is to be understood that any frangible material suitable for this purpose may be utilized. It will be observed that inner portions of the tube 310 and the mass 311 project inwardly beyond the confines of the cup 302 whereby to lend support for the tube 312 and associated components which will now be described.

The device 300 further includes a receiving means or mold structure, generally designated 313, preferably of powdered metal, and an inner tube 314 preferably constructed from Pyrex glass. It is to be understood that any materials which will withstand high temperatures may be utilized.

The receiving means or mold structure 313 may be designed and constructed in various ways but as exemplified in FIGS. 2, 3, and 4, it is preferably comprised of a pair of half or complementary sections 315 and 316. The tube 312, above referred to, constitutes means for maintaining or holding the sections assembled. Each of the sections preferably includes a relatively large annular portion having a bottom wall 317 and side wall structure 318 which define a pocket or recess 319. Each section also preferably includes an integral radial or tapered lateral continuation 320 provided with a semicylindrical groove 321 extending throughout the length of the continuation. Attention is directed to the fact that continuations have opposed longitudinally extending planar edges 322 and that the inner ends of the groove are provided with abutments 323.

The end surface of each of the wall structures of the sections is planar as indicated at 324 and interrupted by a pair of diametrically disposed projections 325 and a pair of diametrically disposed notches or recesses 326 the latter of which are circumferentially spaced 90° apart from the projections. The receiving means or mold structure 313 is preferably so designed and constructed that when the sections are correctly held in assembled relation by the tube 312 which is telescoped into a snug surrounding relationship with the tapered continuations 320, the opposed planar surfaces 322 of the continuations will be held in intimate bearing relationship and the projections 325 will be disposed in interfitting or interlocking relationship with the notches 326 whereby to maintain the marginal end surfaces 324 of the wall structures of the sections in a predetermined spaced parallel relationship so that preferably a plurality of three circumferentially spaced arcuate vents or openings 327 are provided through which a fluid such as gas or air may escape when the molten metal is received in the mold structure.

Experimentation and testing has proven that the optimum gap, spacing, or size of the vents or openings should be within a predetermined range for sampling basic oxygen processed steels due to their higher temperatures. More particularly, in this respect, it was initially believed that no vent openings were essential on the basis that the heat of the molten metal would cause the mold sections to separate and release the trapped gases. However, failures did occur in practice so tests were conducted which proved that the size of the vent or vents was critical in certain structures. It was discovered that a relatively small vent or a narrow gap between the large portions of the sections caused back pressure and restrained the molten metal from entering and completely filling the receiving means or mold cavity. It was further discovered that a vent of relatively large size or an excessive gap between the large portions of the sections caused the molten metal to bleed through the vent and seal the sections together thereby resulting in obtaining a porous test sample of poor quality.

Attention is directed to the fact that the projections and notches constitute means which assist in assembling, locating, aligning, or placing the sections in registry; that the pockets 319, in combination, define a chamber 328 which finally receives the molten metal; that the longitudinal grooves 321 in the continuations, in combination, define a tubular formation or socket which snugly receives one extremity of the glass tube 314 which engages the abutments 323 for limiting inward movement of the tube; and that the lower extremity of the glass tube extends beyond the continuations and through the aperture 306 in the cup 320, and is secured in place by the surrounding cement 311 in the tube 312. It will be apparent that the tube 312 is also firmly anchored in place by the cement 311; that the cement within the confines of the tube 312 assists in sealing and securing the glass tube in the socket, the inner ends of the continuations together and the glass tube in the aperture 306 so that the molten metal will flow through the glass tube prior to reception in the chamber 328 of the receiving means 313. It will be observed that the longitudinal axes of the receiving means 313, glass tube 314 and the tube 312 are coincidental and inclined with respect to the longitudinal axis of the outer jacket 301. It is to be understood that the device may be made in which the aforementioned axes may be in alignment with the longitudinal axis of the jacket or parallel thereto.

After a sample more or less in a lollypop form has been cast, certain of the various components such as the housing 301, tubes 310, 312 and 314, sections 315 and 316, glass tube 314 and cups may be readily separated, destroyed, disintegrated, or broken apart so as to obtain the sample.

In view of the foregoing, it should be manifest that the structure illustrated in FIGS. 2, 3 and 4, among other things comprises an outer jacket or housing 301; an inner tube 314 which is supported by a mass of material 311 which is highly resistant to heat deterioration; that the means 313 is disposed within the confines of the housing and is provided with a chamber 328 which communicatively connects with the upper end of the tube 314; that means which may comprise one or more of the cups 302, 303, 304 provide at least a second chamber which communicatively connects with the lower end of the tube 314 for initially receiving a liquid for transmission into said tube and the chamber 328; and that means, such as the fusible element 309, serves to condition the fluid in the second chamber prior to its reception into the tube 314.

The device depicted in FIG. 5 of the drawing comprises a unique organization whereby a metal sample of molten metal and the temperature at which it solidifies may be substantially simultaneously obtained. More specifically, this objective is preferably obtained by operatively connecting a receiving means generally designated 600 with an assembly designated 601. The device includes a housing 602 and four cups 603, 604, 605, and 606, which generally respectively correspond to the housing and cups shown in FIG. 2. A tubular member 607 is anchored in the upper cup 603 by masses of cement or insulating material 608 and 609 and the receiving means 600 comprises a pair of half sections 610 (one shown). The receiving means is mounted in a vertical central position in the tubular member by the cement 609 which surrounds lower semi-cylindrical extensions 610' of the receiving means. A tube 611 also constitutes a receiving means. This tube is preferably constructed from Pyrex, and is secured between the extensions with the cement 609 surrounding a lower portion of the tube for holding the latter in an aperture provided in a bottom wall of the cup 603.

The receiving means 600 also includes a head comprised of generally hollow round portions which when assembled define a chamber 612. Attention is directed to the fact that the round head portions are respectively provided with upper substantially semi-cylindrical extensions 613 which when brought together define a tubular passage 614 and that the end of each of these extensions is provided with an inturned semi-circular flange 615.

The assembly 601 may be designed and constructed in various ways and the means employed for operatively connecting the same may include an insulator plug 616 having a thermocouple 617 anchored axially therein with a lower portion thereof extending beyond the lower end of the plug. This plug has a reduced cylindrical portion 618 and a head portion 619, with an external annular groove 620 between these portions so that when the plug 616 and the sections 610 of the receiving means are correctly assembled the reduced portion will be disposed in the passage 614 with the inturned flanges 615 of the receiving means in groove 620 for interlocking these components and locating the lower portion of the thermocouple in the chamber 612. The thermocouple is thus carried by the receiving means. The head portion 619 of the plug 616 is preferably provided with a pair of diametrically disposed end recesses 621 in which a pair of contact receptacles 622 are respectively secured, with conductors 623 being respectively connected to the receptacles and to the thermocouple.

The assembly 601 also preferably includes a male plug unit comprising an elongated tube 624 preferably constructed of quartz; a block 625 of insulating material secured in a lower end of the tube; a pair of male contacts 626 fixedly carried by the block and a pair of conductors 627 extending into the tube 624 and respectively connected to the contacts 626. With this unique setup, the contacts 626 of the male plug unit may be readily detachably and electrically connected to the receptacles 621 so that the temperature of the sample, through the agency of the thermocouple 617, may be measured and recorded by a voltage measuring potentiometer 628 disposed at a safe location from the molten metal vessel. The detachable connections affords at least release of the male plug unit from the remainder of the assembly 601 and its possible reuse. The conductors 627 are preferably enclosed in a conduit and extend through the tube 624 and are of a sufficient length for extension through the upper end of the housing 602 for connection with the potentiometer.

The thermocouple is utilized to measure the freezing temperature of the sample. As the freezing temperature of steel is a function of the carbon content, a measurement of this temperature can be converted to carbon content to provide an immediate carbon analysis of the steel bath during the sampling procedure, thereby saving time over the analytical method. This factor is important because modern steel producing furnaces reduce the carbon content of the molten bath so rapidly that instantaneous measurements of the bath are necessary to satisfactorily arrive at the desired end point for the finished steel. The freezing temperature analysis is applicable to all baths of ferrous or non-ferrous metals.

The device shown in FIG. 6 is similar to that of FIG. 5 to the extent that a sample of molten metal and its temperature may be substantially simultaneously obtained. More particularly, the device includes a receiving means generally designated 650, an electrical assembly generally designated 651 which is operatively connected to a thermocouple 775. The device also preferably includes an outer tubular non-metallic housing 652 having an internal longitudinally extending groove 653 in its lower extremity in which the thermocouple is disposed, with a large cup or cap 654, preferably of metal, secured in surrounding relation to this extremity and extending therebeyond to define in combination with the housing and a lower cup 655 a chamber 656'. The cup 655 and two additional cups 656 and 657 respectively substantially correspond to those similarly positioned in FIG. 2.

A tubular member 658 is fixed in the uppermost cup 657 by masses of cement 659 and 660 and semi-cylindrical extensions 661 (one shown) of the receiving means are anchored in the cement 660 for holding half-sections of the receiving means assembled so that head portions thereof define a chamber 662 for receiving a sample of molten metal. A tube 663 also constitutes a receiving means. This tube is preferably constructed from Pyrex, and is also embedded in the cement 660 and extends through an aperture in a bottom wall of the cup 657 and communicatively connects with the chamber 662.

As stated above a mass of insulating material or cement may constitute a supporting means for the receiving means. More particularly, this supporting means comprises the masses of cement 659 and 660 and may also include the tubular member 658 and the cups 655, 656 and 657 and it may be further said that at least a portion of the thermocouple is disposed in the housing 652 as well as between a portion thereof and a portion of the supporting means.

Each of the half sections of the receiving means 650 is also preferably provided with an upper extension 664 and these are preferably held together by an assembly generally designated 665. This assembly may include a tubular member 666 having a lower extremity which slidably detachably receives the upper extensions 664 of the receiving means which assists in holding the sections together and also includes an insulator 667 carrying a pair of diametrically disposed contact receptacles 668. A male plug unit generally designated 669 may include an elongated quartz tube 670 closed at its lower end by an insulator 671 carrying a pair of male contacts 672 for detachable reception in the receptacles 668. A pair of conductors 673 in a conduit are respectively connected to the contacts 672 and extend outwardly through the tube 670 and housing 652 for connection with a potentiometer located a safe distance from the vessel containing the molten metal. A pair of conductors 674 in a conduit are respectively connected to the contact receptacles 668 and with the thermocouple 775, the latter of which is partially held in the groove 653 by rims of the cups 655 and 656. It will be observed that a lower portion of the thermocouple projects below the lower end of the housing and into the chamber 656' so that the temperature of the molten metal may be readily ascertained as it flows into the chamber. The thermocouple is positioned in relation to the cup 655 to obtain optimum metal circulation around or about the thermocouple to ensure consistent temperature readings. The large protective cup or cap 656 is preferably press-fitted into the housing and provides protection from slag or kish contamination as the device is immersed into the metal being sampled.

In FIG. 7 there is disclosed a device 800 which may substantially correspond to either of the devices shown in FIGS. 5 and 6, except that a thermocouple generally designated 801 is depicted as extending through or into a receiving means 802 in a position transverse to the longitudinal axis of the device or receiving means. A pair of compensating lead conductors 803 adapted for connection with indicating or recording apparatus located remote from device extend downwardly into a tubular housing 804 of the device and into generally L-shaped recesses 805 provided in a wall of a tubular member 806 secured in the housing 804. Thermocouple wires 807 extend transversely through the receiving means 802 at right angles to the longitudinal axis of the device and have outer ends which extend into the recesses 805 and connect at 808 with the lead conductors 803 and inner ends which are joined at a junction 809 which is centrally located in the receiving means and in a Pyrex or quartz tube 810, the latter having ends which are disposed in mating notches 811 provided in half sections of the receiving means for holding and locating purposes. The junction 809 is the hot junction or sensor of the thermocouple and is protectively located in the center of the receiving means whereby the molten metal flowing into the receiving means will completely surround the sensing junction of the thermocouple for achieving maximum sensitivity.

The device 300 is adapted to be dipped into a bath 10 of molten metal contained in a vessel 11. More particularly, an elongated wand 12 is detachably connectible to the device 300 to facilitate immersing the lower extremity of the device into the bath through a layer of slag 13. The device is held in the bath for a brief period of time; for example, from 3 to 10 seconds. The devices shown in FIGS. 5, 6 and 7 are also adapted to be dipped or immersed in a bath of molten metal or other hot medium for obtaining samples.

Having thus described my invention, it is obvious that various modifications may be made in the same without departing from the spirit of the invention, and therefore, I do not wish to be understood as limiting myself to the exact forms, construction, arrangements, and combinations of parts herein shown and described.

I claim:

1. A device for obtaining a sample of molten metal comprising: an elongated tubular housing, elongated separable half-sections forming a receiving means having an enlarged upper extremity vented through an upper end of said housing and a smaller lower extremity provided with a passage, mounting means connected to said housing, a mass of cement carried by said mounting means for surrounding and supporting only said lower extremity so that said upper extremity is unsupported in said housing whereby when the device is immersed in a bath of molten metal a sample thereof will flow only through said passage into said enlarged extremity via said lower extremity, said sections also forming extension means which project axially away from said upper extremity with a space surrounding the same, structure secured in relation to said extension means, a first electrical means carried by said structure, a thermocouple having at least a portion thereof disposed in said housing, said thermocouple being connected to said first electrical means, and second electrical means detachably connectible with said first electrical means for extension outwardly through said housing for connection with electrical apparatus at a remote location.

2. The device defined in claim 1, in which said thermocouple is disposed diametrically through said upper extremity of said receiving means.

3. The device defined in claim 1, in which said extension means comprises a pair of portions, and said structure is clamped between said portions.

4. The device defined in claim 1, including means surrounding said extension means and said structure for holding the latter in relation to said extension means.

5. The device defined in claim 1, in which said thermocouple is disposed between said passage and a portion of said housing.

6. A device of the kind described comprising: a housing, means for receiving a sample of hot liquid, means for supporting said receiving means in said housing, and a thermocouple is disposed in said housing between said supporting means and a portion of said housing.

7. The device defined in claim 6, including a plurality of means axially spaced from one another and said receiving means for temporarily protecting the latter, said housing is elongated and said receiving means is located in a lower extremity thereof and comprises a chamber and tubular means extending therefrom in a direction toward this extremity for receiving the liquid, and said housing has an upper extremity whereby to facilitate connection of a wand thereto.

8. The device defined in claim 6, in which a portion of said housing is provided with an internal slot, and at least a portion of said thermocouple is located in said slot.

9. The device defined in claim 6, in which said supporting means includes a mass of cement, at least a portion of said receiving means is embedded in said mass, and at least a portion of said thermocouple is disposed in said housing between said mass and a portion of said housing.

10. The device defined in claim 6, in which said housing is of an elongated tubular character, the supporting means includes a mass of cement, the receiving means has a lower portion embedded in the mass and an upper portion which extends axially away from the mass, and at least a portion of said thermocouple is disposed between said mass and a portion of said housing.

11. The device defined in claim 6, including a means for temporarily protecting said thermocouple.

12. The device defined in claim 6, in which said receiving means is provided with entrance means, including means which serves to temporarily protect said entrance means and said thermocouple.

13. The device defined in claim 6, including electrical connection means which is carried by said receiving means, and said thermocouple is connected to said electrical connection means.

14. The device defined in claim 6, including a first electrical connection means which is carried by said receiving means, said thermocouple is connected to said first electrical connection means, and a second electrical connection means which is detachably connectible with said first electrical connection means and with electrical apparatus at a remote location.

15. The device defined in claim 6, in which said housing has an upper open end, including a first electrical connection means which is carried by said receiving means and connected to said thermocouple, and elongated means carrying a second electrical means which is extendible downwardly into said open end whereby said second electrical means may be caused to engage said first electrical connection means.

16. The device defined in claim 6, in which said housing is provided with an opening and with first electrical connection means therein which is connected to said thermocouple, including elongated means insertable into said housing through said opening and provided with second electrical connection means which is engageable with said first electrical connection means, and said elongated means also being provided with conductors which are connectible with apparatus at a location remote from said device.

17. A device of the kind described comprising: a housing, a cup connected to said housing and containing a mass of cement, a pair of substantially identical recessed sections having upper portions and lower portions with the latter embedded in said mass for holding said sections together so that said upper portions define chamber means in said housing for receiving a sample of hot liquid and said lower portions define an entrance leading to said chamber means, electrical connection means supported in said housing, tubular means carried by said upper portions which assist in holding them together and protects at least a portion of said electrical connection means, a thermocouple having at least a portion thereof arranged in said housing, and means operatively connecting said electrical connection means and said thermocouple.

18. In combination: an outer tubular structure and an inner structure connected to said outer structure and supporting means in said outer structure for receiving a hot liquid, and a thermocouple disposed alongside said inner structure and between said structures and adjacent to said receiving means.

19. In combination: an outer tubular structure, means for receiving a hot liquid, an inner structure connected to said outer structure and supporting said receiving means in said outer structure, one of said structures being provided with a groove, and a thermocouple disposed in said groove and adjacent to said receiving means.

20. The combination defined in claim 19, in which the outer tubular structure is provided with said groove.

21. The combination defined in claim 19, in which said thermocouple is located externally of said receiving means.

22. The combination defined in claim 19, including electrical means carried by said receiving means, and said thermocouple is connected to said electrical connection means.

23. The combination defined in claim 19, in which said receiving means includes a chamber, including electrical connection means which is disposed in said outer tubular structure and above said chamber, and means connecting said electrical connection means and said thermocouple.

24. The combination defined in claim 19, including a first electrical connection means disposed in said outer tubular structure, means connecting said electrical connection means and said thermocouple, elongated means insertable in said outer tubular structure and provided with second electrical connection means for engaging said first electrical connection means, and conductor means carried by said elongated means connected to said second electrical connection means for connection with apparatus at a remote location.

25. A subassembly for the purpose described comprising a pair of recessed sections, means for temporarily maintaining these sections assembled to form a chamber provided with an entrance so that when the device is dipped into a bath of molten metal some of the latter will flow into the chamber via said entrance, means for closing said chamber at a location in axially spaced relation to said entrance, and means providing a vent for said chamber at a location between said closed location and said entrance.

26. A device for the purpose described comprising: an outer tube, means having an entrance disposed in said tube for receiving a sample of molten metal, a plurality of means for protecting said entrance, means for deoxidizing some of the molten metal prior to its flow into said entrance, a thermocouple disposed in said tube and externally of said receiving means, and a cap for temporarily protecting said plurality of means, said deoxidizing means and said thermocouple.

27. A device for receiving a sample of molten metal, said device comprising a pair of complementary sections, each of said sections having an intermediate recessed portion, a projection extending laterally in one direction from said recessed portion, and an extension projecting laterally in a different direction from said recessed portion, means for securing said projections together, and means for securing said extensions together whereby said recessed portions define a chamber and said extensions define an entrance through which molten metal may flow into said chamber, said projections and said extensions projecting from said chamber.

28. A device of the kind described comprising: a housing, means for receiving a sample of hot liquid, means for supporting said receiving means in said housing, and a thermocouple disposed in said housing between said receiving means and a portion of said housing.

* * * * *